(12) United States Patent
Orlovsky et al.

(10) Patent No.: US 7,045,059 B2
(45) Date of Patent: May 16, 2006

(54) UNIVERSAL BONDED PHASE MATERIAL FOR CHROMATOGRAPHIC SEPARATION

(75) Inventors: Vladislav Orlovsky, Wheeling, IL (US); Yury Zelechonok, Northbrook, IL (US)

(73) Assignee: SIELC Technologies Corp, Prospect Hts., IL (US)

( * ) Notice: Subject to any disclaimer, the term of this patent is extended or adjusted under 35 U.S.C. 154(b) by 0 days.

(21) Appl. No.: 10/627,636

(22) Filed: Jul. 28, 2003

(65) Prior Publication Data

US 2005/0023203 A1   Feb. 3, 2005

(51) Int. Cl.
*B01D 15/08* (2006.01)

(52) U.S. Cl. .............. 210/198.2; 210/502.1; 210/635; 210/656; 502/401

(58) Field of Classification Search ........... 210/635, 210/656, 198.2, 502.1; 502/401, 402
See application file for complete search history.

(56) References Cited

U.S. PATENT DOCUMENTS

| | | | | |
|---|---|---|---|---|
| 4,118,316 A * | 10/1978 | Talley et al. | ................ | 210/635 |
| 4,298,500 A * | 11/1981 | Abbott | ................ | 502/7 |
| 4,330,440 A * | 5/1982 | Ayers et al. | ................ | 525/54.31 |
| 4,705,725 A * | 11/1987 | Glajch et al. | ................ | 428/405 |
| 4,721,573 A * | 1/1988 | Ramsden et al. | ............ | 210/635 |
| 4,767,670 A * | 8/1988 | Cox et al. | ................ | 428/403 |
| 4,837,348 A * | 6/1989 | Stolowitz et al. | ............. | 556/9 |
| 4,920,152 A * | 4/1990 | Regnier et al. | ............... | 521/31 |
| 4,927,879 A * | 5/1990 | Pidgeon | ................ | 525/54.1 |
| 4,931,498 A * | 6/1990 | Pidgeon | ................ | 525/54.1 |
| 5,045,190 A * | 9/1991 | Carbonell et al. | ........ | 210/198.2 |
| 5,053,133 A * | 10/1991 | Klein et al. | ............ | 210/500.38 |
| 5,277,813 A * | 1/1994 | Feibush et al. | ........... | 210/502.1 |
| 6,322,695 B1 * | 11/2001 | Lee et al. | ................ | 210/198.2 |
| 6,702,943 B1 * | 3/2004 | Johansson et al. | .......... | 210/635 |
| 6,852,230 B1 * | 2/2005 | Belew et al. | ................ | 210/635 |

OTHER PUBLICATIONS

Snyder, Introduction to Modern Liquid Chromatography, second Edition, JW&S (1979), p. 285.*
Boppana, Journal of Chromatography, 631 (1993), p. 251-254.*
O'Gara, LCGC North America (2001), 19(6), p. 632-642.*
Przybyciel, LCGC North America (2002), 20(6), p. 516.*
Snyder, Introduction to Modern Liquid Chromatography, John Wiley and Sons, Inc. New York, 1979, pp. 5-8.*

* cited by examiner

*Primary Examiner*—Ernest G. Therkorn
(74) *Attorney, Agent, or Firm*—Charles F. Lind

(57) ABSTRACT

The invention provides a new universal bonded phase material used for separation of a wide variety of organic and inorganic substances by liquid chromatography. The material is produced by bonding a charge-bearing hydrophobic functional group to the surface of a supporting material. The process of preparation of such material and advantages of using the material are described.

2 Claims, 7 Drawing Sheets

R$_1$ - Alkyloxy-, aryloxy-, alkyl group

R$_2$, R$_3$ - Alkyl or aryl

X - halogen or other group n - 0 - 4

R$_1$ - Alkyloxy-, aryloxy-, alkyl group

R$_2$ - Long Alkyl or aryl chain

Anhydride of diacid

UNIVERSAL BONDED PHASE MATERIAL FOR CHROMATOGRAPHIC SEPARATION

BACKGROUND OF THE INVENTION

The invention relates to materials to be used in liquid chromatography. Liquid chromatography (LC) is a powerful tool in a separation of ionic and neural compounds. Four main types of chromatography are responsible for majority of small molecules separations: Normal phase (NP); Reverse phase (RP), Ion-exchange and ion-exclusion, Typically, each mode of separation requires specifically tailored stationary phase; this is why a significant number of columns is required to cover different types of analytical applications. Occasionally, a stationary phase can perform in two modes of separation; for example, a cyano-stationary phase can be used in reverse phase and normal phase separation modes. [1]. However, this phase has very poor hydrophobic properties and, consequently, a limited application in RP separation. Aminopropyl columns that can also be used as ion-exchange and NP separation media [2] have the same insufficient hydrophobic properties. Even when a stationary phase demonstrates good hydrophobic properties—usually due to a polymer based supporting material—it cannot be used as RP material due to low capacity, poor RP reproducibility, and lower efficiency.

In addition, now manufacturers are offering different brush type columns with embedded polar groups [3] to create an additional interaction (besides RP) between a column stationary phase and an analyte. This allows to improve column efficiency for polar compounds, resolve closely eluted compounds and, sometimes, change column selectivity. With polar embedded groups, it is possible to prevent column collapse or dewetting in pure aqueous mobile phase [4].

However, there still is a problem of having many different stationary phases, each of them for specific separation purposes; the significant numbers of similar columns available on a market from tens of manufacturers creates confusion among end users.

The presented invention is based on the provision of a new liquid chromatography stationary phases with specific arrangement of charge bearing functional groups. The groups are chemically attached to the supporting material but are shielded from direct interaction with mobile phase by an additional layer of permeable material that is also chemically be used for all four main mode of separation and additionally allows performing a wide variety of separations previously not attainable.

The invention introduces a new and improved approach to liquid separation stationary phase for use in liquid chromatography and provides methods for preparation of such liquid separation stationary phase.

SUMMARY OF THE INVENTION

The invention relates to novel materials to be used in liquid chromatography which can be used universally for all main modes of separation of organic hydrophobic compounds based on their hydrophobicity. The typical mobil phase employed for this type separation is a mixture of water and acetonitrile or methanol. Elution order of compounds resolved by reverse phase mechanism strongly correlates with hydrophobic characteristic of the analytes. By selecting a different mobile phase based on a combination of hexane and alcohol, which is typical for normal phase separation, the hydrophobic interaction of the stationary phase with analytes can be completely suppressed, and further separation is achieved by polar interaction mechanism only. Compounds that possess both ionic and hydrophobic properties can be separated either by ion-exchange mechanism, or reverse phase mechanism, or a combination of both. Also the column with shielded ion exchange liquid chromatography stationary phase allows separating compounds by normal mode mechanism, which is based on polar type of interaction of the analyte with polar charged groups of the stationary phase. Thus Shielded based columns can be employed for many types of separations: ion-exchange (cation and anion), reverse phase and normal phase.

DISCRIPTION OF PREFERED EMBODIMENTS

The presented invention relates to novel materials to be used in liquid chromatography. The materials can be used universally for all main modes of separation suitable for organic and inorganic molecules. More particularly, it pertains to a stationary phase with ion-exchange functional} groups embedded in hydrophobic permeable layer and shielded by this layer from direct interaction with the mobile phase. The said hydrophobic layer is built similarly to common brush type RP support comprising of long alkyl chains chemically attached to the surface. The approach and material will be further addressed as Shielded Ion Exchange Liquid Chromatography (SIELC).

Figure 1:
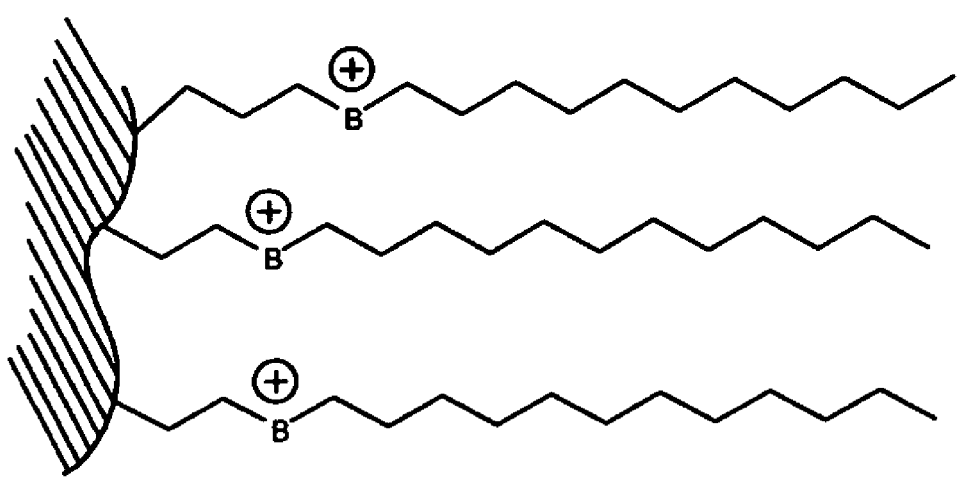
FIG. 1 is a schematic representation of a stationary phase that performs as universal chromatography material with anion exchange properties
Figure 2:
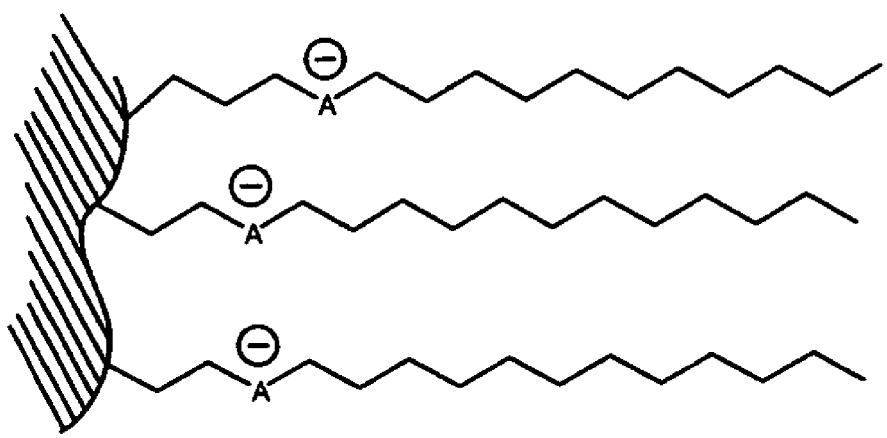
FIG. 2 is a schematic representation of a stationary phase that performs as universal chromatography material with cation exchange properties
Figure 3:
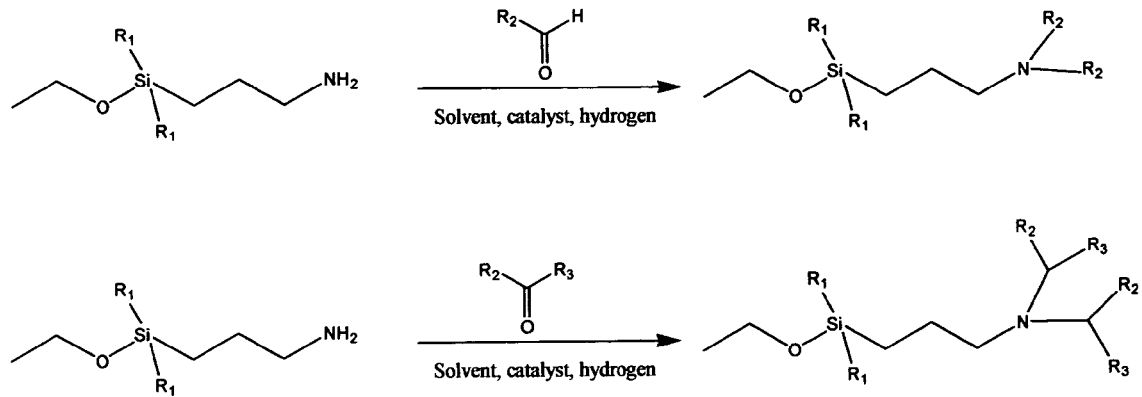
FIG. 3 is a reaction scheme for synthesis of ligand containing tertiary amine and shielding long alkyl chain for attachment to silica gel to create a stationary phase that performs as universal chromatography material with anion exchange properties
Figure 4:
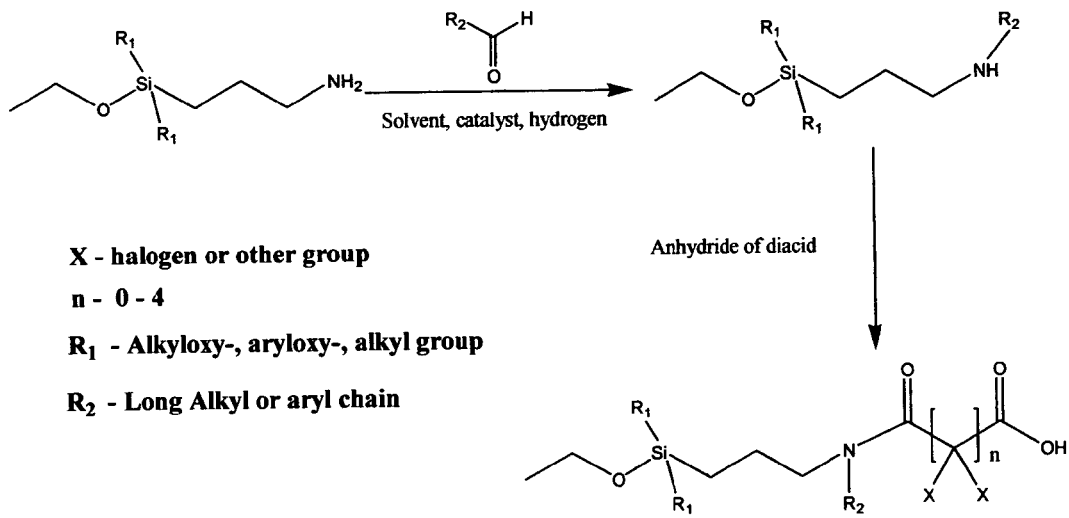
FIG. 4 is a reaction scheme for synthesis of ligand containing a cation exchange site and shielding long alkyl chain for attachment to silica gel to create a stationary phase that performs as universal chromatography material with cation exchange properties
Figure 5:
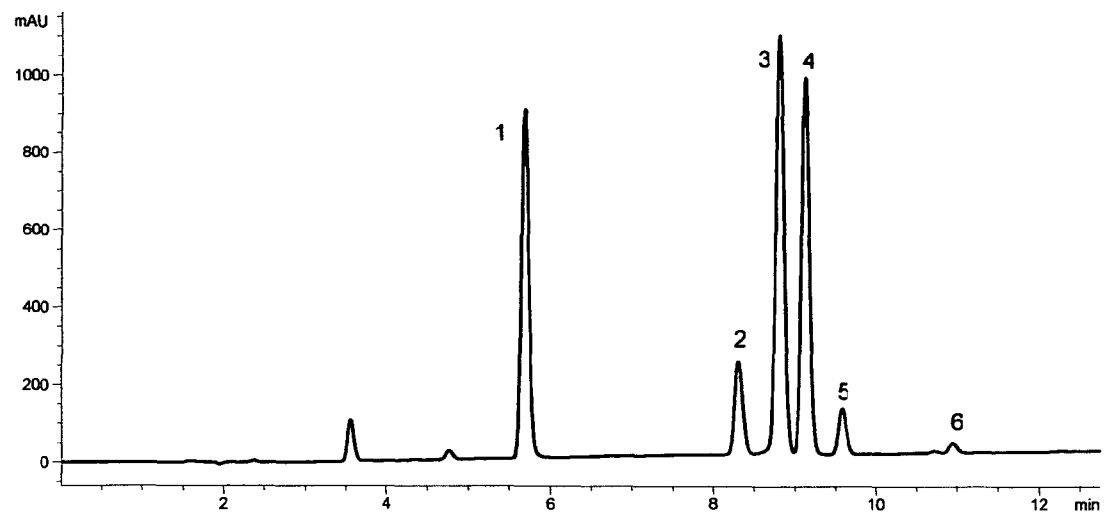
FIG. 5 is a plot showing separation of aromatic compounds by HPLC using the stationary phase described in examples 1, 2 4 and 6 by RP mode

The hydrophobic shielding layer provides separation of organic hydrophobic compounds based on their hydrophobicity. The typical mobile phase employed for this type separation is a mixture of water and acetonitrile (ACN) or methanol. Elution order of compounds resolved by RP mechanism strongly correlates with hydrophobic characteristic of the analytes (FIG. 5). By selecting a different mobile phase based on combination of hexane and alcohol, which is typical for normal phase separation, the hydrophobic interaction of the stationary phase with analytes can be completely suppressed, and further separation is achieved by polar interaction mechanism only.

Compounds that possess both ionic and hydrophobic properties can be separated either by ion-exchange mechanism, or RP mechanism, or a combination of both. Also the column with SIELC stationary phase allows separating compounds by normal mode mechanism, which is based on polar type of interaction of the analyte with polar charged groups of the stationary phase.

Thus, SIELC based columns can be employed for many types of separations: ion exchange (cation and anion), reverse phase, and normal phase.

The new ion-exchange bonded phases material used to separate a wide variety of organic and inorganic substances by liquid chromatography are produced by bonding a charge-bearing functional groups to the surface of a supporting material and by shielding charge-bearing functional groups with a hydrophobic permeable layer. Several approaches to obtain such material are described.

For the anion exchange shielded universal material, the aminopropyletoxy silane reacts with 0.7–2.5 molar equivalent of aliphatic or aromatic aldehyde or ketone in the presence of hydrogen and catalyst in organic solvent (alcohol, aromatic or aliphatic hydrocarbon, ethers and esters, dimethylformamide etc.) to obtain secondary or tertiary amine with long aliphatic or aromatic chain and shielded charge bearing group.

The same tertiary amine can be obtained as a result of a reaction of aminopropyl silane with halogenoalkane in the presence of base. The resulting tertiary amine with long chain is attached to rigid support containing hydroxyl groups (silica gel, crosslinked polymer etc.) in toluene or other organic solvent at the elevated temperature to obtain universal chromatography material with anion exchange properties. This material can be used directly for SIELC.

For the cation exchange brush type material, the aminopropyletoxy silane is treated in presence of hydrogen and catalyst with an equal molar amount of aldehyde or ketone to obtain a secondary amino silane, which is further treated with anhydride of diacid. The resulting ligand is attached to a rigid support containing hydroxyl groups (silica gel, cross linked polymer etc.) in toluene or other organic solvent at the elevated temperature to obtain the universal chromatography material with cation exchange properties.

Both silica gel based materials contain ion exchange bonded phase material, which bears cation or anion exchange groups or combination of anion and cation groups shielded from direct interaction with mobile phase by long alkyl or aryl chain.

High performance liquid chromatography column was packed according to the standard procedure [5]

EXAMPLE 1

Solution of decyl aldehyde (3.12 g, 20 mmol) in 10 ml of absolute ethanol was added to ethanolic solution (10 ml) of 3-aminopropyltriethoxysilane (2.21 g, 10 mmol). The reaction mixture was stirred at 40° C. for 30 minutes and then charged into 100 ml pressure vessel. The vessel was purged with nitrogen, and 300 mg of 10% palladium on carbon was added. After purging with nitrogen (3×) and hydrogen (3×), the reaction mixture was hydrogenated at 50 psi of hydrogen for 2 hours. The catalyst was removed by filtration and washed with 2×20 ml of ethanol. The washes and the filtrate were combined, and ethanol was removed by vacuum distillation to obtain 4.72 g of N-[3-(triethoxysilyl)-propyl]-didecylamine. The resulting material was added to the slurry of twenty-three grams of 5 um Kromasil dry silica gel (dried at 130° C. and 25 inches of Hg overnight) in 200 ml of dried toluene. The slurry was refluxed at 110° C. in 3 neck round bottom flask equipped with condenser and magnetic stirrer. After 12 h, the reaction mixture was cooled to room temperature, filtered and washed with toluene (2×100 ml) and ethanol (2×100 ml). The isolated functionalized silica gel was dried in the vacuum oven at 100° C. and 25 inches of Hg.

EXAMPLE 2

The procedure in Example 1 was repeated using dodecyl aldehyde in place of decyl aldehyde and 5% platinum on carbon instead of 10% palladium on carbon.

EXAMPLE 3

The procedure in Example 1 was repeated using 3-aminopropyl methyldiethoxysilane or 3-aminopropyl dimethyletoxysilane.

EXAMPLES 4–9

Do not appear in the written portion of the instant specification.

EXAMPLE 10

Toluene solution of N-[3-(triethoxysilyl)-propyl]-decylamine. The solution of N-[3-(triethoxysilyl)-propyl]-decylamine was added to the solution of glutaric anhydride (1.14 g, 10 mmol) in 10 ml of tetrahydrofuran. The reaction mixture was stirred for one hour and then added to the slurry of twenty grams of 5 um Kromasil dry silica gel (dried at 130° C. and 25 inches of Hg overnight) in 200 ml of toluene. The slurry was refluxed at 110° C. in 3 neck round bottom flask equipped with the condenser and magnetic stirrer. After 6 h, the reaction mixture was cooled to room temperature, filtered and washed with toluene (2×100 ml) and ethanol-water (2×100 ml, 1:2 ratio). The isolated functionalized silica gel was dried in the vacuum oven at 90° C. and 25 inches of Hg.

EXAMPLE 11

The procedure in Example 10 was repeated with heaxafluroglutaric anhydride instead of glutaric anhydride.

EXAMPLE 12

The procedure in Example 10 was repeated with maleic anhydride instead of glutaric anhydride and tetrahydrofuran instead of toluene.

EXAMPLE 13

The procedure in Example 10 was repeated with oxalyl chloride instead of glutaric anhydride.

EXAMPLE 14

The procedure in Example 10 was repeated with dodecyl aldehyde instead of decyl aldehyde and succinic anhydride instead of glutaric anhydride.

EXAMPLE 15

The procedure in Example 10 was repeated with benzaldehyde instead of decyl aldehyde and heaxafluroglutaric anhydride instead of glutaric anhydride.

EXAMPLE 16

The procedure in Example 10 was repeated with octyl aldehyde instead of decyl aldehyde and fumaroyl chloride instead of glutaric anhydride.

EXAMPLE 17

The procedure in Example 16 was repeated with cyclohexanone instead of octyl aldehyde.

EXAMPLE 18

The procedure in Example 15 was repeated with 5% platinum on carbon instead of 10% palladium on carbon and tetrahydrofuran as a solvent.

EXAMPLE 19

The procedure in Example 10 was repeated with dodecyl aldehyde instead of decyl aldehyde and hexafluoroglutaric anhydride instead of glutaric anhydride. Rhodium on carbon catalyst was used instead of palladium on carbon.

EXAMPLE 20

All HIGH PERFORMANCE LIQUID CHROMATOGRAPHY columns were slurry packed according to standard procedure, using materials from experiments 1 through 19. FIG. 5 illustrates the separation achieved using the product from examples 1, 2, 4, and 6. The column was 150 mm long and 4.6 mm in diameter. A mixture containing 5 aromatic compounds was separated using water, acetonitrile, and trifluoroacetic acid gradient mixture (40/60/0.2–20/80/0.2 in 12 min) as a mobile phase. The flow rate was 1.0 ml/min.

EXAMPLE 21

Figure 6:
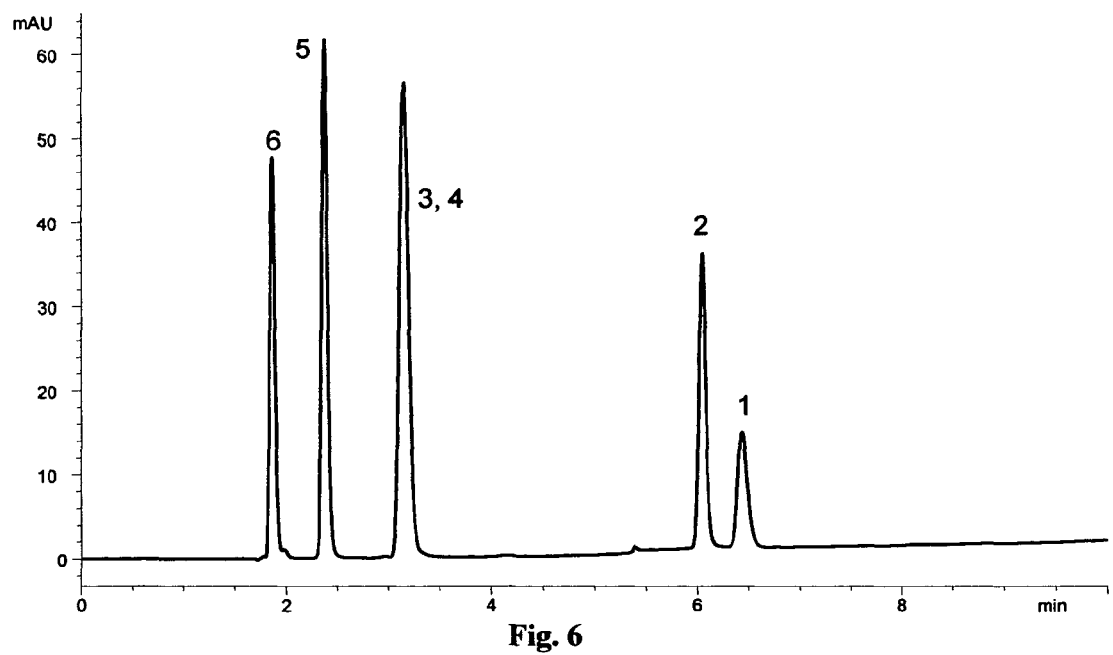
FIG. 6 is a plot showing separation of aromatic compounds by HPLC using the stationary phase described in example 3 and 8 by normal phase mode

FIG. 6 illustrates the separation achieved using the product from examples 3 and 8. The column was 150 mm long and 4.6 mm in diameter. A mixture containing 5 aromatic compounds was separated using hexane and tert-butyl alcohol gradient mixture (99.5/0.5–95/5 in 10 min) as a mobile phase. The flow rate was 1.0 ml/min.

EXAMPLE 22

Figure 7:
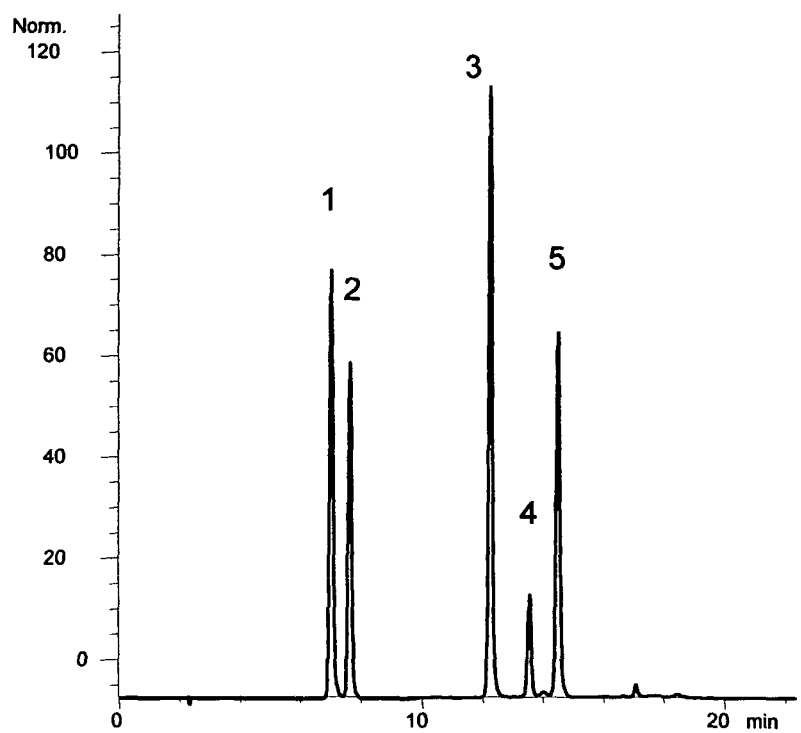
FIG. 7 is a plot showing separation of substituted benzoic acids by HPLC using the stationary phase described in examples 2, 3 and 4 by combination of RP and ion exchange mode.

FIG. 7 illustrates the separation achieved using the product from examples 2, 3, and 4. The column was 150 mm long and 4.6 mm in diameter. A mixture containing of 5 isomers of dihydroxybenzoic acid was separated using water, acetonitrile, and trifluoroacetic acid gradient mixture (100/0/0.03–50/50/0.1 in 15 min) as a mobile phase. The flow rate was 1.0 ml/min.

EXAMPLE 23

Figure 8:
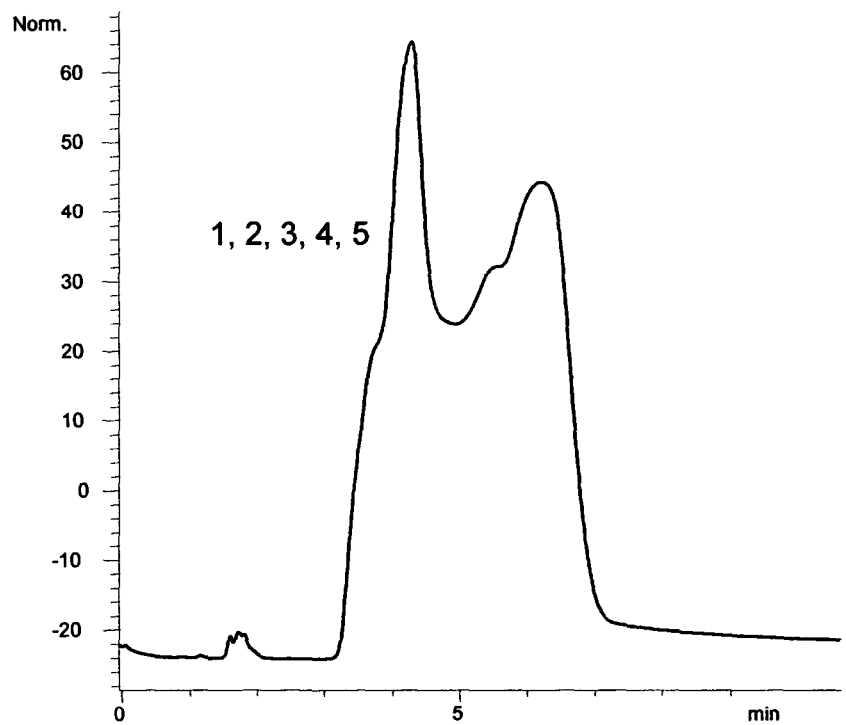
FIG. 8 is a plot showing poor separation of substituted phenols by HPLC using a commercially available anion-exchange stationary phase based on propylamino chemistry

FIG. 8 illustrates inability of commercially available propylamino column having only ion-exchange separation properties to resolve said mixture of dihydroxybenzoic acids in identical conditions to example 22

EXAMPLE 24

Figure 9:
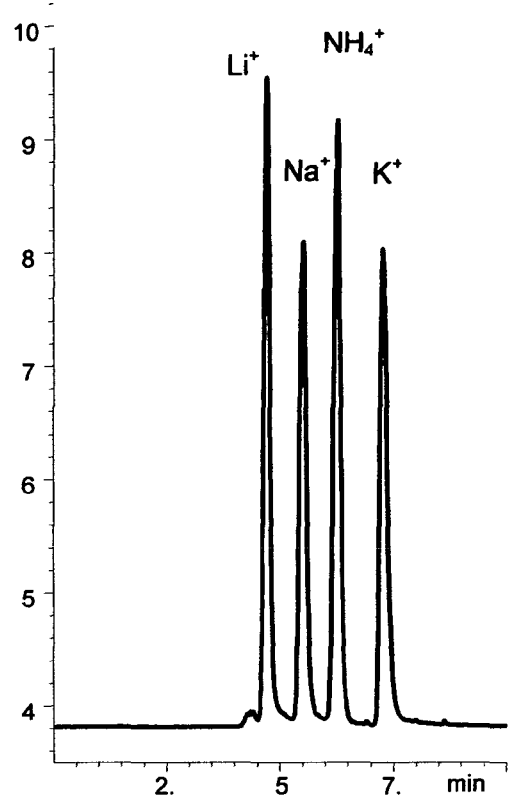
FIG. 9 is a plot showing separation of mixture of cations by stationary phase described in examples 11, 13, 15 and 19 by ion-exchange mechanism only.

FIG. 9 illustrates the separation achieved using the product from examples 11, 13, 15, and 19. The column was 250 mm long and 4.6 mm in diameter. A mixture containing of 4 cations was separated using water, acetonitrile, and trifluoroacetic acid mixture (50/50/0.1) as a mobile phase. The flow rate was 1.0 ml/min.

EXAMPLE 25

Figure 10:
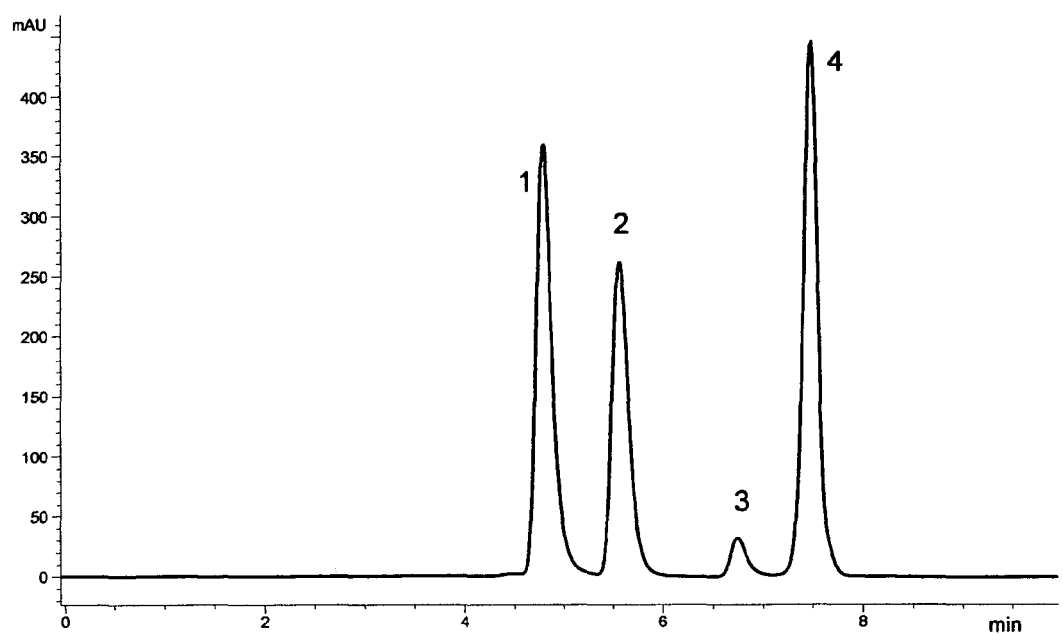
FIG. 10 is a plot showing separation of mixture of organic acids by stationary phase described in example 11 employing an ion-exclusion mechanism.

FIG. 10 illustrates the separation achieved using the product from examples 11. The column was 250 mm long and 4.6 mm in diameter. A mixture containing of 4 carboxylic acids was separated using water, acetonitrile, and sulfuric acid mixture (75/25/0.03) as a mobile phase. The flow rate was 0.03 ml/min.

EXAMPLE 26

Figure 11:
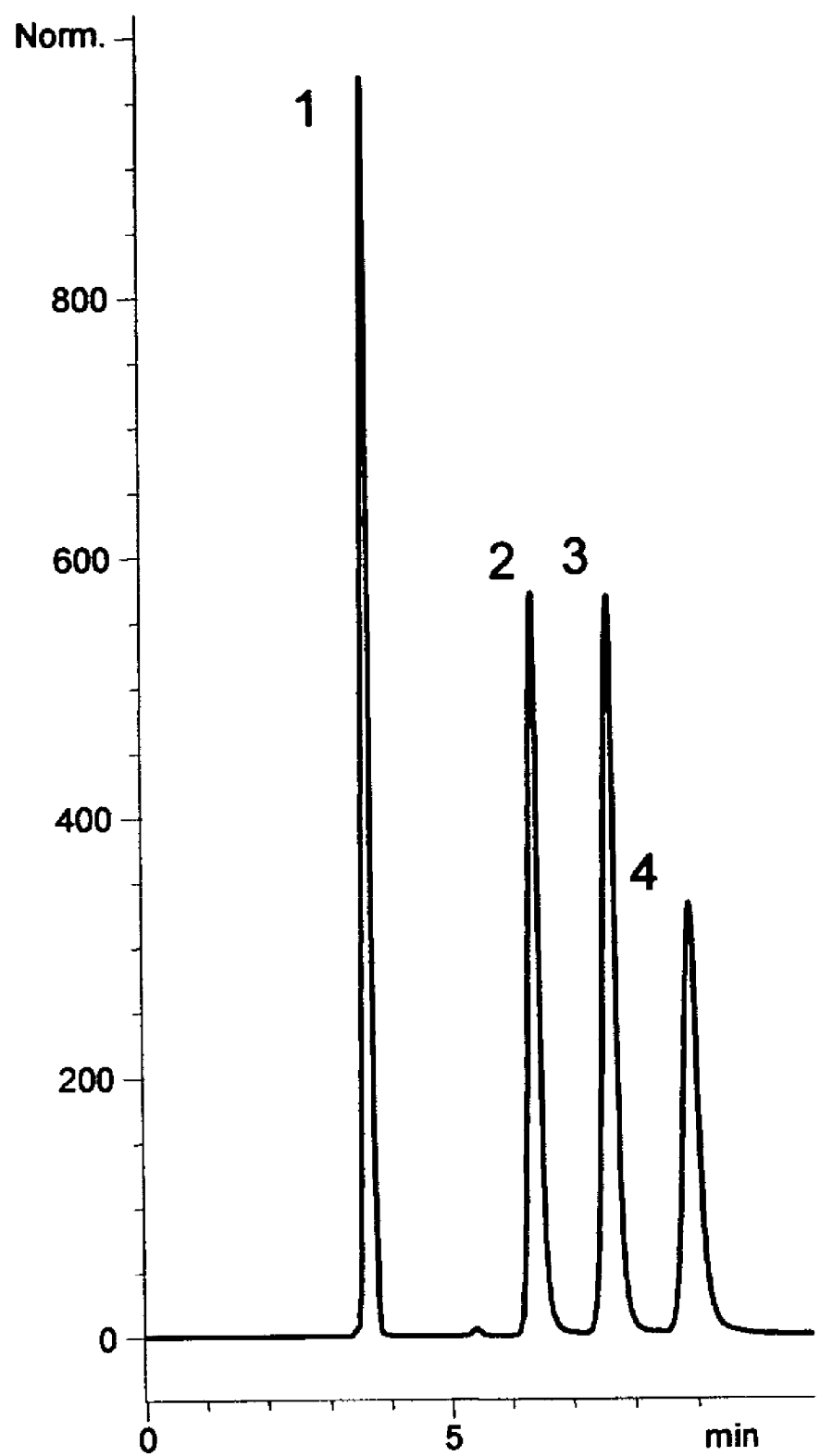
FIG. 11 is a plot showing separation of nucleosides separated by stationary phase described in example 13 by combination of ion exchange and RP mechanisms.

FIG. 11 illustrates the separation achieved using the product from examples 13. The column was 250 mm long and 4.6 mm in diameter. A mixture containing of 4 nucleosides was separated using water, acetonitrile, and trifluoroacetic acid mixture (90/10/0.1) as a mobile phase. The flow rate was 1.0 m/min.

EXAMPLE 27

Figure 12:
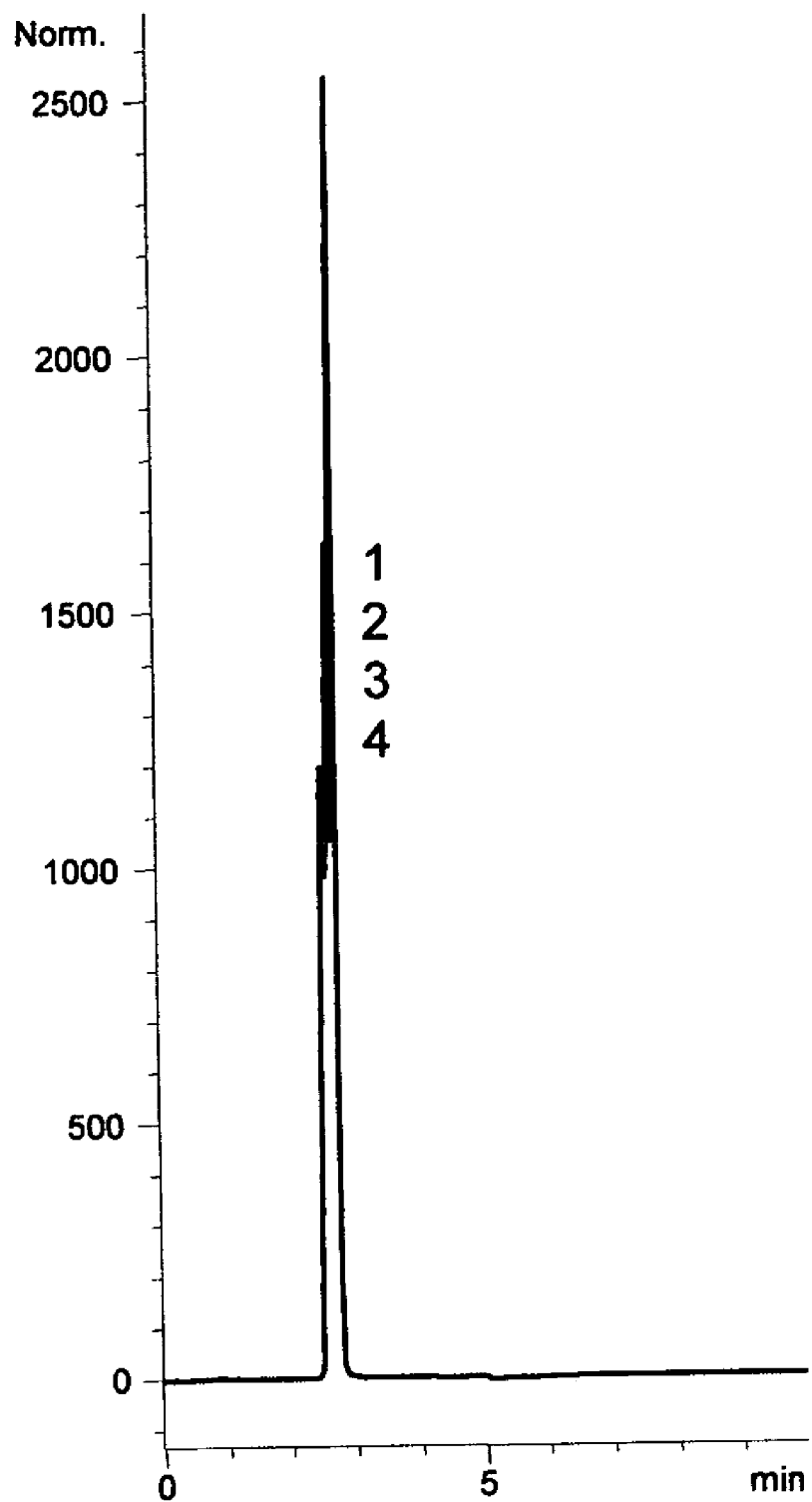
FIG. 12 is a plot showing poor separation of nucleosides using commercially available RP stationary phase by RP mechanism only

FIG. 12 illustrates inability of commercially available reverse phase column having only hydrophobic separation properties to resolve said mixture of nucleosides in identical condition to example 26

What is claimed is:

1. A stationary phase for high performance liquid chromatography analysis of small molecules using a mobile phase, said stationary phase comprising
   a rigid supporting material having a surface;
   an ion bearing functional group and a hydrophobic functional group chemically attached together;
   said ion bearing functional group being chemically attached directly to the rigid supporting material and said hydrophobic functional group being indirectly connected relative to the rigid supporting material surface only via its connection to the ion bearing functional group;
   said hydrophobic functional group being remotely spaced from the rigid supporting material surface and overlying the ion bearing functional group and forming a permeable stationary layer shielding said ion bearing functional group from full direct contact with the mobile phase; and said hydrophobic functional group having a carbon chain at least eight carbon atoms long.

2. A stationary phase according to claim 1, further comprising said hydrophobic functional group having a carbon chain twelve carbon atoms long.

* * * * *